(12) United States Patent
Curles

(10) Patent No.: US 8,156,090 B1
(45) Date of Patent: Apr. 10, 2012

(54) MAINTAINING FILE NAME UNIQUENESS IN AN APPLICATION DEVELOPMENT ENVIRONMENT OF A COMPUTING SYSTEM

(75) Inventor: Michael L. Curles, Herndon, VA (US)

(73) Assignee: Unisys Corporation, Blue Bell, PA (US)

( * ) Notice: Subject to any disclaimer, the term of this patent is extended or adjusted under 35 U.S.C. 154(b) by 1093 days.

(21) Appl. No.: 11/799,348

(22) Filed: May 1, 2007

Related U.S. Application Data

(63) Continuation-in-part of application No. 11/315,522, filed on Dec. 22, 2005.

(51) Int. Cl.
*G06F 7/00* (2006.01)
*G06F 17/30* (2006.01)
*G06F 12/00* (2006.01)
*G06F 17/00* (2006.01)

(52) U.S. Cl. .................. 707/694; 707/758; 707/828
(58) Field of Classification Search ......................... None
See application file for complete search history.

(56) References Cited

U.S. PATENT DOCUMENTS

| | | | | |
|---|---|---|---|---|
| 5,625,822 A * | 4/1997 | Brett | ............................. | 717/145 |
| 5,745,902 A * | 4/1998 | Miller et al. | .......................... | 1/1 |
| 5,758,352 A * | 5/1998 | Reynolds et al. | ..................... | 1/1 |
| 5,765,169 A * | 6/1998 | Conner | ................................ | 1/1 |
| 6,532,481 B1 * | 3/2003 | Fassett, Jr. | ........................... | 1/1 |
| 7,562,358 B2 * | 7/2009 | Bennett et al. | ................ | 717/170 |
| 2009/0265697 A1 * | 10/2009 | Bhat et al. | ..................... | 717/163 |

* cited by examiner

*Primary Examiner* — Charles Rones
*Assistant Examiner* — Charles Adams
(74) *Attorney, Agent, or Firm* — Robert P. Marley

(57) ABSTRACT

A computer system comprises an operating system that provides a file system for storage of objects. A compile manager creates a repository within the file system in response to a compilation request. A directory stores file names previously generated by the compile manager during a compilation process. In response to the request for compilation of one of the objects, the compile manager automatically creates the repository within the file system with a unique file name based at least in part on an object name associated with the requested object and a number of file names within the directory that match at least a portion of the object name. Each filename may include one or more characters from a filename portion of the name of an object and one or more characters from a version portion of the name of the object.

13 Claims, 9 Drawing Sheets

MAINTAINING FILE NAME UNIQUENESS IN AN APPLICATION DEVELOPMENT ENVIRONMENT OF A COMPUTING SYSTEM This application is a continuation-in-part of application Ser. No. 11/315,522, filed Dec. 22, 2005, the contents of which is incorporated herein by reference.

TECHNICAL FIELD

The invention relates to computing systems and, more particularly, to techniques that maintain filenames in a computing system.

BACKGROUND

Configuration management is an information technology and telecommunications technique that assists in revision control of hardware, software, firmware, documentation, and other components of technology solutions. One aspect of configuration management is the control and recording of changes made to applications, documents, and processes throughout a system lifecycle. In order to facilitate recording of such changes, configuration management software may create files to store information about objects that the software manages.

Certain operating systems, such as the ClearPath Plus OS 2200™ operation system from Unisys Corporation of Blue Bell, Pa., maintain "files" having a plurality of storage "objects." That is, within the file system provided by the operating system, a file provides a logical association of a set of individual storage objects. In one sense, the "file" within the OS2200 may thus be viewed as similar to the more commonly understood "folder" of such operating systems as the Windows™ operating system available from Microsoft Corporation.

Within the OS 2200, in some instances, files are required to have unique identifiers, and each object within the same storage file must also have a unique identifier. The string identifier, referred to as the filename, has a maximum length fixed at a certain number of characters. For example, the OS 2200 operating system imposes a 25-character limit on the name on the storage files. The 25 characters are composed of a 12-character filename name, a slash character, and a 12-character version name.

In some instances, configuration management software executing within an operating environment provided by the operating system automatically creates one or more files that hold objects associated with the application development. For example, the configuration management software may automatically create files to store objects containing revision information, compilation information, or other information associated with an application. During this process, the configuration management software may use several characters for its file naming convention or for another purpose. This leaves less than the maximum number of characters allowed by the operating system available to uniquely name files corresponding to objects that potentially have up to the maximum number of characters allowed. This situation may give rise to two or more objects being assigned identical names, even when all the objects associated with the files have unique names. This problem may be especially common in environments where hundreds or thousands of users are working within the same configuration management, i.e., an application development environment.

In the past, users of configuration management software have had to manually ensure that objects processed by the software were uniquely named up to a certain number of characters. This was done so that configuration management software did not create files or objects having identical names. When a computing system has numerous users, the likelihood of generating duplicate filenames and the difficulty of manually ensuring that objects have sufficiently unique names increase.

SUMMARY

In general, the present disclosure is directed to techniques for generating unique filenames when processing storage objects in a computing system. For example, the techniques may be used to guarantee that as objects are processed having nearly identical object names, the objects will be placed in a unique file. Moreover, embodiments of the techniques may be used to ensure that even objects created by different users and having the same file name will ultimately be placed in unique files for processing. Each filename may include one or more characters from a filename portion of the name of an object and one or more characters from a version portion of the name of the object.

As described herein, the techniques described account for any limitations imposed by an operating system not only with respect to naming conventions for individual objects, but for any limitations on the combination of the name of a file and the name of any object associated with that file. For example, the techniques may be used to ensure file name uniqueness when the underlying operating system imposes a limitation on the total number of characters that are allocated to a file name and an associated object name.

In this manner, the techniques disclosed may maintain filename uniqueness even when a computing system has many users. Some disclosed techniques provide for generating the name of a file associated with objects having names that may have more characters than the number of characters available to name the file. The disclosure is also directed to providing a technique for programmatically generating a unique name for a file associated with an object after the object is created or modified. Some techniques disclosed allow a compile manager to automatically assign unique names to files that contain information about objects being managed by configuration management software.

In one embodiment, a method comprises receiving with a computer a request to compile a storage object located within a file system provided by an operating system of a computer. The method also comprises, in response to the compilation request, identifying an object name associated with the storage object, wherein the object name includes a filename portion and a version portion. Furthermore, the method comprises determining a current root name that includes one or more characters of the filename portion and one or more characters of the version portion. The method also comprises searching a set of previously generated names to determine a number of previously generated names that are equivalent to the current root name. A name is equivalent to the current root name when the name was generated by modifying a root name that was equal to the current root name. In addition, the method comprises automatically modifying the current root name based on the number of previously generated names that are equivalent to the current root name. Furthermore, the method comprises generating a unique file name that includes the current root name. The method also comprises creating a repository within the file system in accordance with the unique file name.

In another embodiment, a computer system comprises an operating system executing on the computing system. The operating system presents a file system for storage of objects. The computer system also comprises a names table that stores file names previously generated by the compile manager. The compile manager comprises a name identification module that, in response to the request for compilation of one of the objects, identifies an object name associated with the one of the objects. The object name includes a filename portion and a version portion. The compile manager also comprises a root name module that determines a current root name that includes one or more characters of the filename portion and one or more characters of the version portion. In addition, the compile manager comprises a search module that searches a set of previously generates names to determine a number of previously generated names that are equivalent to the current root name. A name is equivalent to the current root name when the name was generated by modifying a root name that was equal to the current name. The compile manager also comprises a root name modification module that automatically modifies the current root name based on the number of previously generated names that are equivalent to the current root name. Furthermore, the compile manager comprises a filename generation module that generates a unique filename that includes the current root name. The compile manager also comprises a repository creation module that creates the repository within the file system in accordance with the unique filename.

In another embodiment, a computer system comprises means for compiling an object within a file system of a computer. The computer system also comprises means for storing file names previously generated by the means for compiling. The means for compiling comprise means for identifying, in response to the request for compilation of one of the objects, an object name associated with the one of the objects. The object name includes a filename portion and a version portion. The means for compiling also comprises means for determining a current root name that includes one or more characters of the filename portion and one or more characters of the version portion. In addition, the means for compiling comprises means for searching a set of previously generates names to determine a number of previously generated names that are equivalent to the current root name. A name is equivalent to the current root name when the name was generated by modifying a root name that was equal to the current name. In addition, the means for compiling comprises means for automatically modifying the current root name based on the number of previously generated names that are equivalent to the current root name. The means for compiling also comprises means for generating a unique filename that includes the current root name. Furthermore, the means for compiling comprises means for creating the repository within the file system in accordance with the unique filename.

The techniques disclosed may provide several advantages over the prior art. For example, the techniques may save users time and effort by automatically handling multiple objects with nearly identical names. The techniques may also permit the generation of a large number of unique filenames. The techniques may lessen the need to manually monitor the creation of files with unique shorter names which incorporate portions of potentially longer names that may be similar to each other. Furthermore, the techniques may permit the generation of filenames that include portions of object names that humans may use to understand the relationships between the filenames and the object names. For instance, the filenames may include one or more characters from a version portion of an object name. The version portion of the object name may contain information that tends to differentiate objects.

The details of one or more embodiments of the invention are set forth in the accompanying drawings and the description below. Other features, objects, and advantages of the invention will be apparent from the description and drawings, and from the claims.

DETAILED DESCRIPTION

Certain embodiments of the invention will now be described, by way of example, with reference to the accompanying drawings. One skilled in the art will understand that certain features and positions of objects depicted in the figures can be altered or varied without conflicting with or deviating from the scope of the presently disclosed invention.

Figure 1:
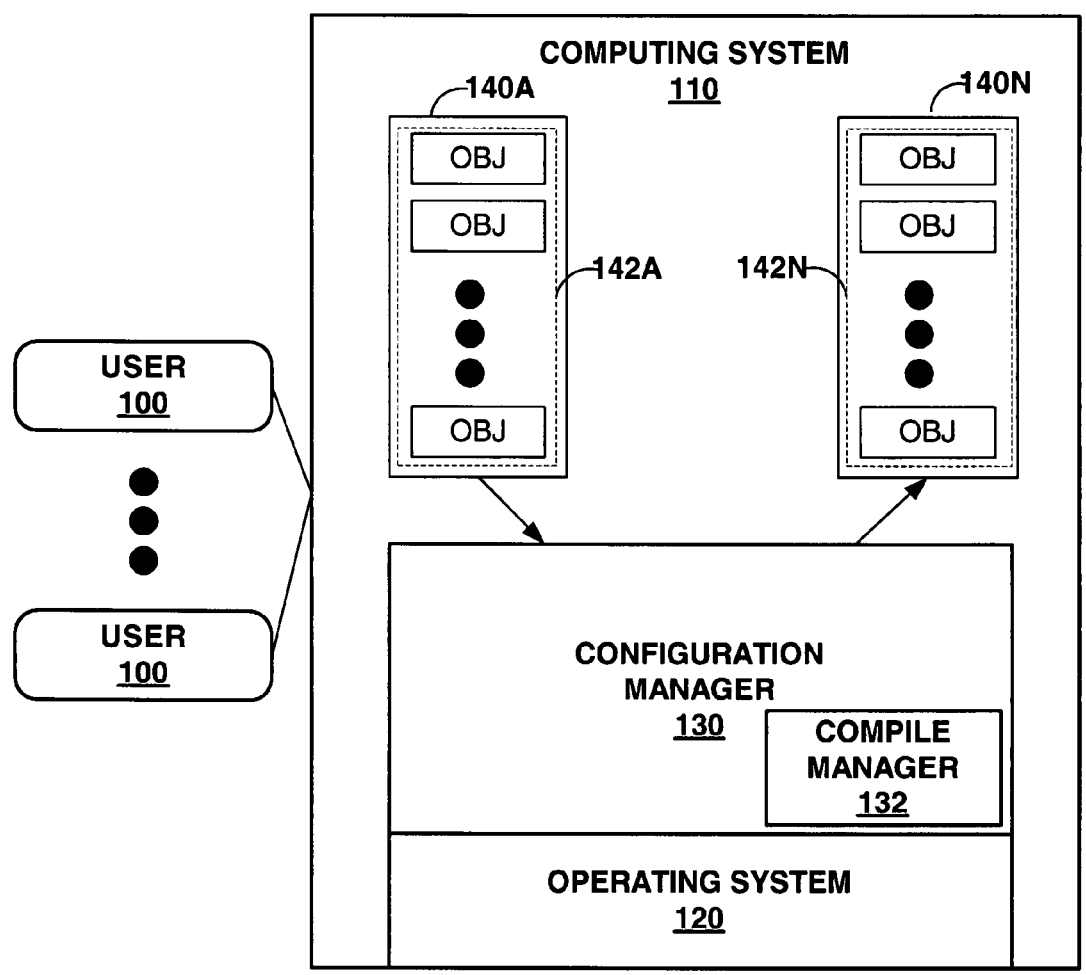
FIG. 1 is a block diagram illustrating a computing system in accordance with embodiments of the invention.

FIG. 1 is a block diagram illustrating a computing system 110 designed for configuration management according to certain embodiments of the invention. In this exemplary embodiment, computing system 110 includes an operating system 120, a configuration manager 130 and a plurality of files 140A-140N (collectively, files 140). That is, each of files 140 provides a logical association for a set of individual storage objects 142A-142N (collectively, objects 142). For example, file 140A provides a construct for grouping a plurality of objects 142A. Similarly, file 140N provides a similar construct for grouping a plurality of storage objects 142N.

In contrast, an individual storage object 142 represents any type of storage object recognizable by a file system provided by operating system 120 and accessible to users 100 or configuration manager 130. For example, an individual storage object may be a data file of information, a document, an executable software application, source code, a script, a system log or any other item that may be individually stored within the file system. Thus, each of files 140 represents logical containers in which one or more objects 142 may be logically stored. That is, operating system 120 allows files 140 to be created as an abstract association of one or more of objects 142. In this regard, files 140 may be viewed as similar to "folders" in other operating systems, such as the Windows™ operating system provided by Microsoft Corporation.

In general, configuration manager 130 provides automated configuration management and version control for application packages, e.g., third generation language (3GL) business applications, deployable on computing system 110. For example, configuration manager 130 may implement an automated or semi-automated approach or methodology to configuration management and version control for, for example, an OS2200 system provided by Unisys Corporation or other high-end mainframes. Configuration manager 130 allows users 100 to generate software application packages for various software application groups, and deploy the software application groups within the computing environment of computing system 110. Although described for exemplary purposes in reference to a high-end mainframe system, the techniques may readily be applied to any computing environment. In general, computing system 110 may have one or more processors capable of executing software instructions stored on computer-readable media.

As illustrated in FIG. 1, in one embodiment, configuration manager 130 includes compile manager 132 for compilation of source code within any of objects 142 when users 100 develop and deploy business application groups. Configuration manager 130 may manage all the consequences of a change in any of objects 142 containing source code and, as a result of this capability, initiates not only the automatic compilation of the object storing the source code, but also compiles those related objects storing source code that are affected by the change.

During this application development, compilation and deployment process, configuration manager 130 may track, generate, purge, and transfer one or more objects 142 within files 140 under the direction of users 100. For example, configuration manager 130 may maintain information about revisions made to objects 142 throughout a system lifecycle.

As described herein, configuration manager 130 applies techniques for automatically generating unique identifiers for files 140 when processing objects 142, e.g., during a compilation process. For example, configuration manager 130 may apply the techniques to dynamically generate files 140 having unique file names when compiling individual objects 142 having nearly identical object names (as specified by users 100). In other words, the techniques ensure that even objects 142 created by different users and having the same or similar object names will ultimately be placed in dynamically created files 140 having unique names for subsequent processing. This creates unique repositories that may be used as containers for other objects produced during the compilation process. Moreover, the technique for maintaining filename uniqueness may be programmatic and require little user intervention. The technique may allow a large number of users 100 to interact with configuration manager 130 to create and modify objects 142 in the computing system 110 without requiring users 100 or administrators to use manual techniques for ensuring that all files 140 comply with the strict naming requirements imposed by operating system 120.

Figure 2:
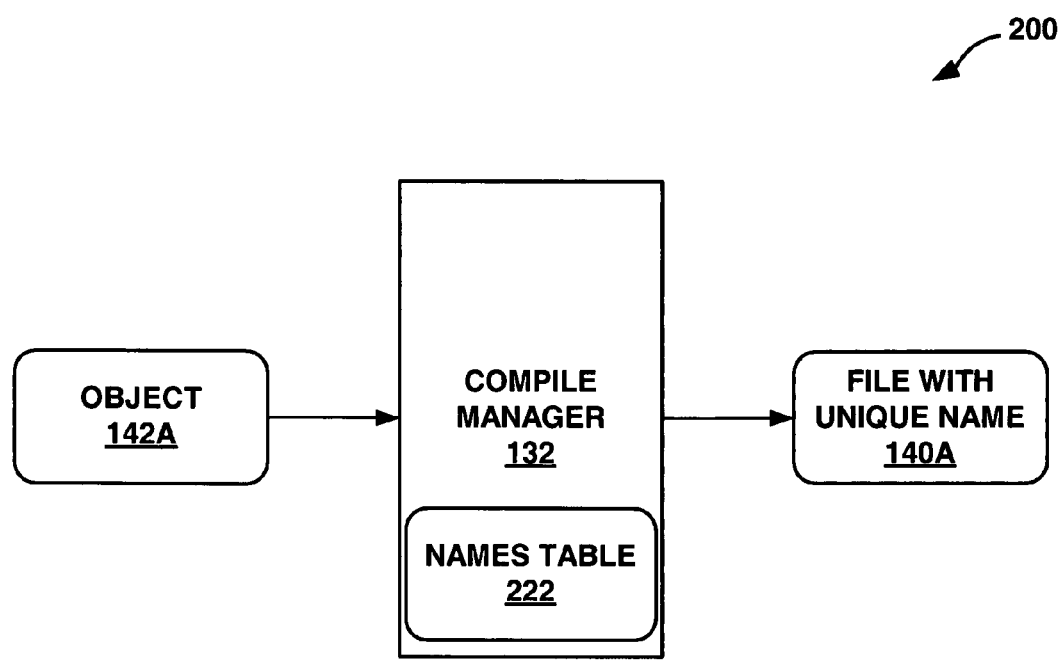
FIG. 2 is a block diagram illustrating an exemplary process performed by a compile manager in accordance with one embodiment of the invention.

FIG. 2 is a data flow diagram illustrating in further detail the file naming process 200 performed by compile manager 132 of FIG. 1 during a compilation process. During the compilation process, compile manager 132 identifies an object 142A to be compiled. After identifying object 142A, compile manager 132 determines the name of object 142A and may perform some initial operations. For example, the compile manager 132 may define a threshold number N of characters that may be extracted from the object name for use in generating a unique file name. For example, compile manager 132 may truncate the object name if the number of characters in the object name exceeds a threshold.

In the embodiment shown in FIG. 2, compile manager 132 manages a names table 222 that contains a directory of file names generated by compile manager 132 when processing objects on behalf of users 100 and configuration manager 130. In other words, names table 222 stores complete or partial portions of file names that compile manager 132 has previously dynamically generated when processing objects 142.

After the optional initial operations are performed on the object name, compile manager 132 compares the name to the entries in names table 222. In some embodiments, compile manager 132 calculates a number of entries in names table 222 substantially equivalent to the object name. Compile manager 132 may then combine at least a portion of the object name with information obtained from a search of names table 222 to generate a unique file name. Compile manager 132 may optionally perform additional processing on the unique name, such as adding a version name or adding additional characters to the name according to a naming convention used by compile manager 132.

Compile manager 132 may then create a new file 140 in accordance with the unique name. In other words, when processing an individual object (object 142A in this example), compile manager 132 dynamically generates a file having a unique name based on the particular object being compiled. Compile manager 132 may then use the file, which may logically be viewed as a container or file system folder, as a repository for associated objects that may be produced during the compilation phase, such as compilation logs or other individual objects.

Figure 3:
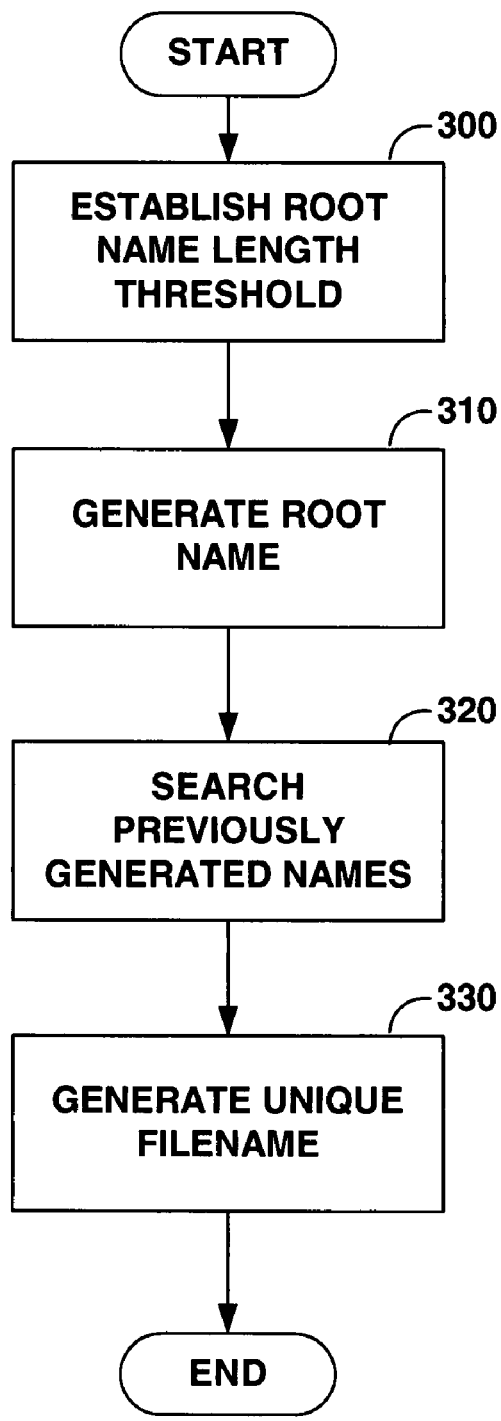
FIG. 3 is a flowchart illustrating the generation of unique filenames in a computing system.

FIG. 3 is a high-level flowchart illustrating the generation of unique filenames according to certain embodiments of the invention. In general, the flowchart illustrates one mode of operation of computing system 110 (FIG. 1).

Initially, compile manager 132 establishes a threshold N to define a maximum number of characters in a root name (300). A root name represents a portion of the name of the created file 140A that originates from the object name of the object 142A currently being processed. In some embodiments, the threshold is set by a user 100 or other administrator of computing system 110. In other embodiments, compile manager 132 selects a threshold based on characteristics of the operating system 120 and/or based on the properties of the naming convention used by the configuration manager 130.

The threshold may contain information about filename limitations imposed by operating system 120 and configuration manager 130. For example, a version of the OS 2200 operating system from Unisys limits object names to 25 characters. Of these 25 characters, 12 characters are used for a filename, 12 characters are used for a version name, and one character (e.g., a '/' character) is a delimiter between the filename from the version name. Meanwhile, the CMplus configuration management software from Unisys uses a 12-character qualifier and an asterisk delimiter in its file naming convention, leaving only 12 characters to uniquely name files associated with objects that have up to 25 characters. In this case, setting a root name threshold of 10 characters, for example, would allow compile manager 132 to uniquely name and create many files associated with objects having names beginning with 10 identical characters.

Upon establishing an appropriate threshold, compile manager 132 generates a root name (310). The root name is generated by selectively manipulating the name of the object 142 currently being processed and for which compile manager 132 is creating a file 140A. The manipulations may be performed when the number of characters in the name of the object 142 exceeds a threshold, for example. Compile manager 132 may also replace or delete certain characters, such as delimiters, in the name of the object 142 while generating the root name.

After generating a root name, compile manager 132 searches names table 222 to identify file names that it has previously generated (320). The purpose of the search is to determine the extent to which the root name will need to be modified in order to generate a unique filename. In some embodiments, compile manager 132 performs the search by comparing the generated root name with previously generated root names. In other embodiments, compile manager 132 modifies the root name in certain ways before comparing the modified root name with previously generated root names that may also have been modified. Compile manager 132 collects information, such as a count of matching names, during the search that is used to generate the name of the created file 140A.

Finally, compile manager 132 generates a unique name for a new file 140A by combining the root name with information obtained from the search 320 of previously generated names (330). In some embodiments, the unique filename also includes other objects, such as a version name or one or more delimiters. The use of the term "combining" in this disclosure is open-ended. Filenames that include various other features not mentioned herein are also within the scope of this disclosure.

Figure 4A:
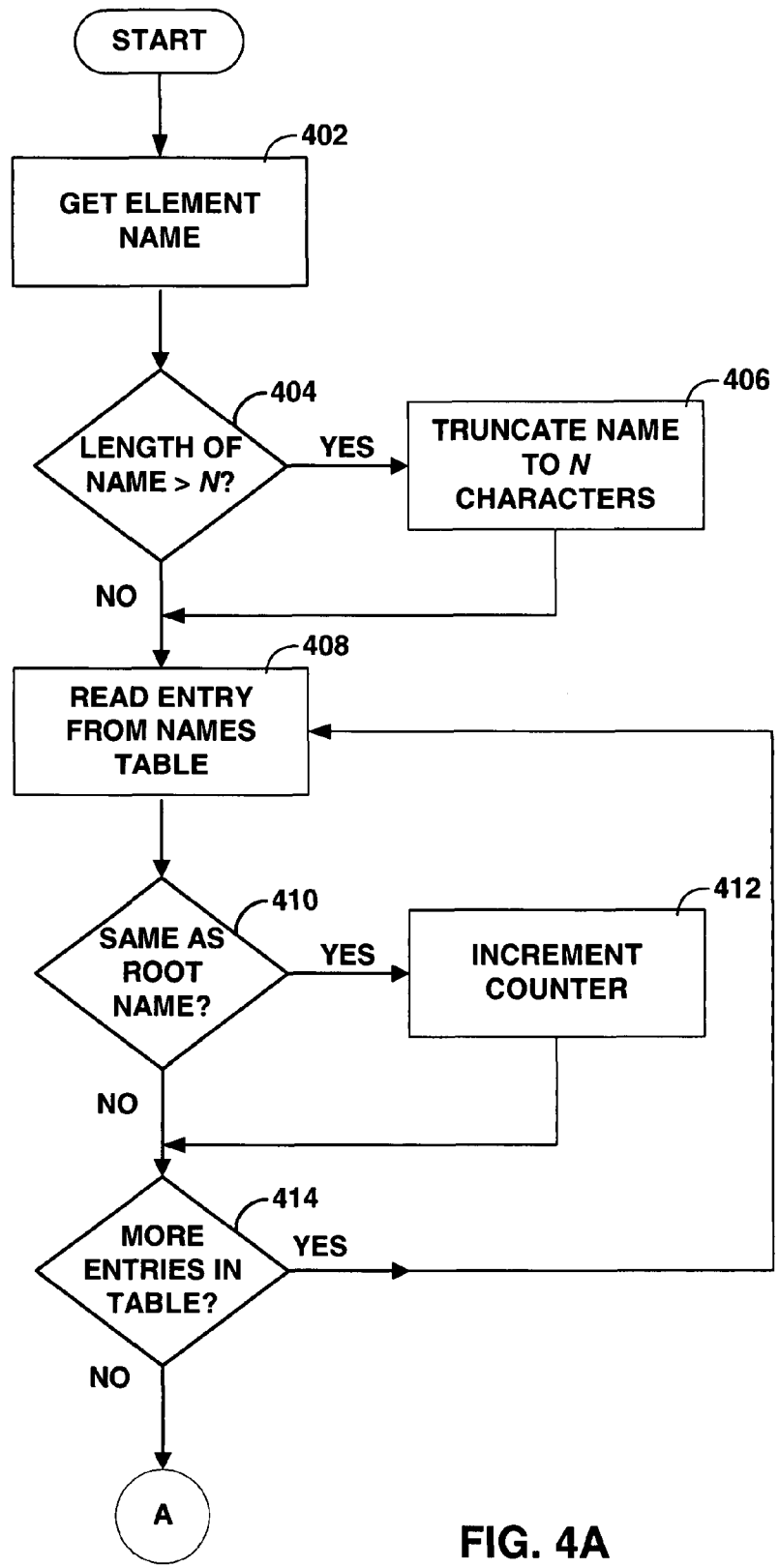
FIGS. 4A and 4B are a flowchart further illustrating in further detail the operation of a computing system including unique file naming functionality.
Figure 4B:
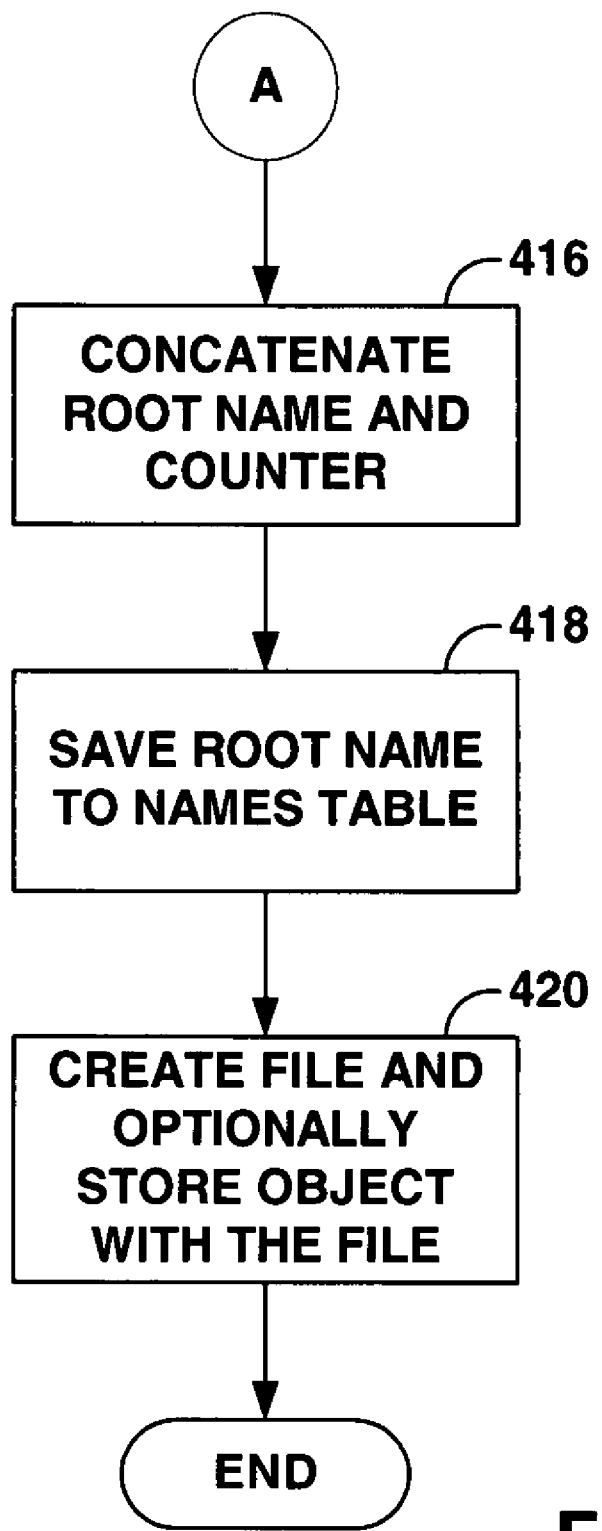

FIGS. 4A-4B are a flowchart further illustrating exemplary operation of a computing system, such as computing system 110, in further detail. In this example, the flowchart of FIGS. 4A-4B is described with respect to operation of compile manager 132 (FIG. 1) when processing an object 142 (FIG. 2) to dynamically generate a file 140 during a compilation process in a manner that ensures the generated file has a unique file name for storing one or more other objects that may be additionally generated during compilation.

Initially, compile manager 132 is invoked during a compilation phase of an application group. During this process, compile manager 132 processes one of objects 142 and retrieves a current name associated with that object by one of users 100 (402).

Next, compile manager 132 compares the length of the object name with a threshold N to determine whether the length of the name of object 142 exceeds the threshold N (404). Compile manager 132 uses the threshold value N to represent the maximum portion of the object name that will be incorporated into a unique name of the file 140. The threshold value N may be set according to filename limitations imposed by operating system 120. The threshold value N may also take into account file naming conventions used by a configuration manager. In addition, threshold value N may be set according to any requirements of configuration manager 130 that reserve a portion of the name space for versioning.

For example, in one embodiment, filename limitations of operating system 120 may require that a concatenation of both: (1) the name of one of files 140, and (2) the name of one of objects 142 stored in that file does not exceed twenty-five characters in length. In addition, configuration manager 130 may require usage of the most significant twelve characters for version and other information. In this case, compile manager 132 may set a threshold N of ten characters, reserving two of the remaining twelve characters for ensuring uniqueness. In some embodiments, the threshold N may be adjusted when more characters are needed to maintain filename uniqueness. Such adjustments may occur programmatically when necessary or may be made by a user 100 or administrator of the computing system 110.

If the entire length of the object name exceeds the threshold N (YES of 404), compile manager 132 truncates the object name so that the number of characters in the name does not exceed the threshold (406). The number of characters in the object name may also be reduced by other techniques, e.g., by selectively removing characters in the name according to an algorithm. Application of the truncation procedure produces a truncated portion of the object name, referred to herein as the "root name." The root name may also incorporate characters from other processing steps. For example, the root name may include delimiters, a version name, or other characters used in a file naming convention. In this manner, compile manager 132 uses at least part of the original object name.

Next, compile manager 132 begins a comparison of the resultant root name to root portions of previously generated object names. For example, compile manager 132 accesses names table 222 and retrieves a root portion of a previously generated object name (408). As described above, names table 222 represents a repository for root portions (i.e., root N characters) of object names that were previously generated by compile manager 132 when processing objects 142 and generating object names.

Compile manager 132 compares the retrieved object name with the root name (i.e., the truncated portion of the original object name) (410). If the root name is equivalent to the retrieved object name, then compile manager 132 increments a counter (412). Compile manager 132 then proceeds to retrieve a next name from the names table 222 and repeats this comparison until the last name in the names table 222 is reached (414). In this manner, the counter represents the number of root names within names table 222 that match the root portion (i.e., the truncated portion) of the object name being processed.

After the compile manager 132 has searched all of the names in the names table 222, the compile manager 132 generates a unique name for the file 140. In the embodiment shown in FIG. 4B, compile manager 132 concatenates the root name of the object name currently being processed with a character representation of the counter that reflects the number of names in the names table 222 equivalent to the root name (416). The counter may be reflected in the unique file name in various ways, including as a decimal number, a hexadecimal number, or some other alphanumeric representation. Other techniques may also be used for creating the unique name of the file 140, such as adding a delimiter between the root name and the counter, adding a version name to the root name, or adding other special characters used in a naming convention. Such techniques are within the scope of this disclosure.

During or after the unique filename generation process, compile manager 132 creates a new entry within names table 222 to save the root name for the current object (418). In some embodiments, compile manager 132 saves a variation of the root name rather than the exact root name to the names table 222. The purpose of the names table 222 is to maintain a record of names that have been previously generated so that names subsequently generated can be unique. The saving of any data that reflects the root name, such as a hash of the name, a portion of the root name, or a combination of the root name with other data, is within the scope of this disclosure.

Finally, compile manager 132 creates a file based on the unique name, and stores the object within that newly created file (420). Consequently, compile manager 132 has processed the current name of the object to generate a unique file name capable of storing multiple objects. Compile manager 132 utilizes this newly created file as a repository for further objects (e.g., compilation logs or listings) generated during the compilation of the current object. In this manner, compile manager 132 ensures that nearly identical object names will be placed in unique files when processed by a configuration management system, and that those files may be utilized to store additional objects. Moreover, the techniques ensure that even objects created by different users and having the same file name will ultimately have unique file names and object names maintained by the operating system and, therefore, may be readily compiled via compile manager 132 and utilized via configuration manager 130.

The first column of Table 1 below includes example pseudocode to further illustrate the unique naming techniques described herein. Column 2 indicates a current value for a first unique object name generated by compile manager 132 at each executed step of the pseudocode, assuming N is set to a value of 10. Column 3 indicates a current value for a second object name generated by compile manager 132 after processing the first object name.

JECT and determines that one previously processed object name utilized this same root. As a result, compile manager 132 creates a new file named TEST$OBJEC2 for storage of any other objects associated with the compilation of the second object.

Figure 5:
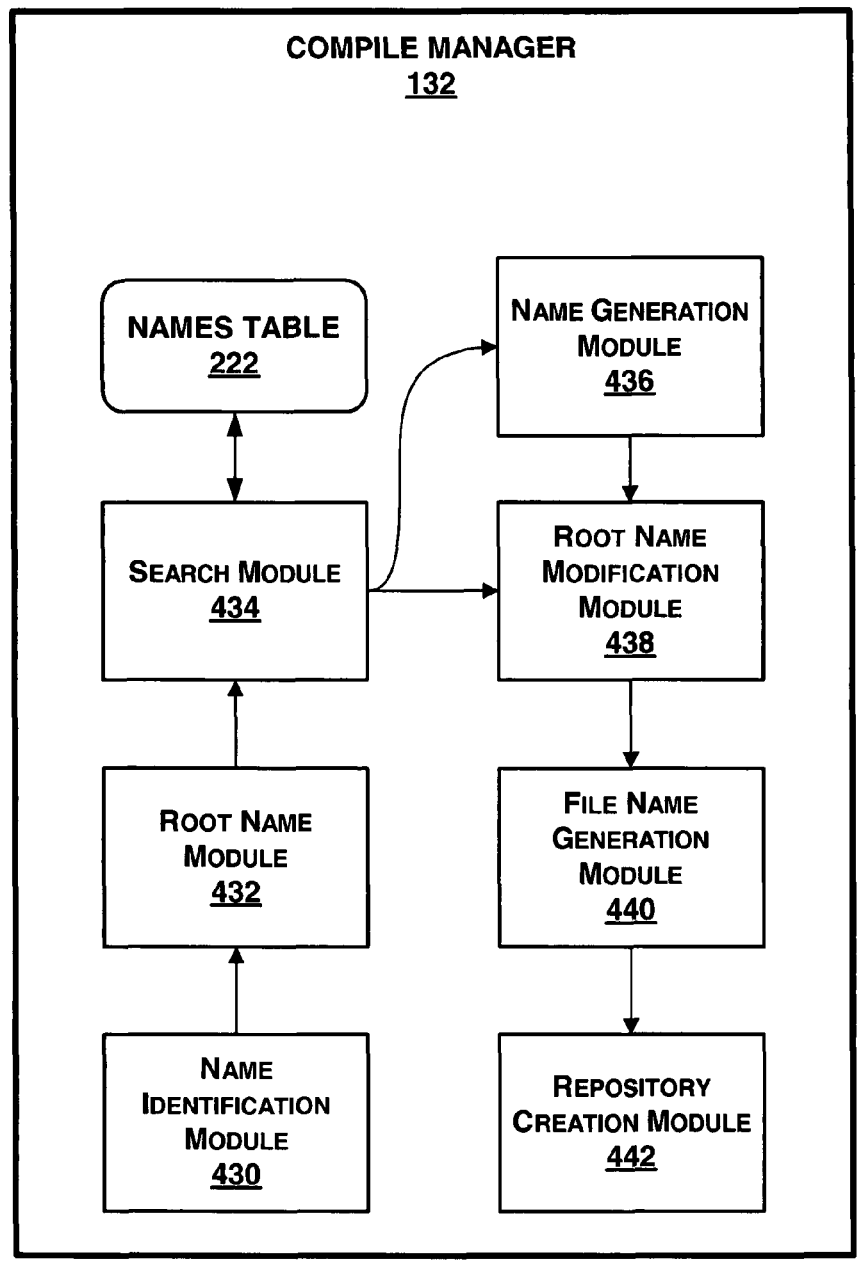
FIG. 5 is a block diagram illustrating exemplary details of a compile manager.

FIG. 5 is a block diagram illustrating exemplary details of compile manager 132. In some circumstances, one of users 100 may input a large number of objects, each of which the user has associated with provisional names that start with a common sequence of characters. For example, user 100A may associate a first object with the name "LSI$RES-NAME/SECURITYPGM1", a second object with the name

TABLE 1

| Pseudocode | Object Name A | Object Name B |
|---|---|---|
| SET ROOT TO OBJECT NAME | TEST/OBJECT | TEST/OBJECTB |
| IF LEN(ROOT)>N | true (11) | True (12) |
|   SET E TO FILE TEXT BEFORE "/" | TEST | TEST |
|   IF LEN(E)<N+1 | true (4) | true (4) |
|     SET VVV TO OBJECT TEXT AFTER "/" | OBJECT | OBJECTB |
|     IF LEN(E)>0 | true (4) | true (4) |
|       IF LEN(V)>0 | true (6) | true (7) |
|         SET FN TO E$V | TEST$OBJECT | TEST$OBJECTB |
|         SET L TO LEN(FN) | 11 | 12 |
|         IF LEN(L) > N | true (11) | true (12) |
|           SET ROOT TO LEFT N CHARS OF FN | TEST$OBJEC | TEST$OBJEC |
|         ELSE | | |
|           SET ROOT TO FN | | |
|         ENDIF | | |
|       ENDIF | | |
|     ENDIF | | |
|   ELSE | | |
|     SET AA1 TO OBJECT NAME LEFT N CHARS | | |
|   ENDIF | | |
| ELSE | | |
|   SET EEE TO FILE TEXT BEFORE "/" | | |
|   IF LEN(E)<N+1 | | |
|     SET V TO OBJECT TEXT AFTER "/" | | |
|     IF LEN(E)>0 | | |
|       IF LEN(V)>0 | | |
|         SET FN TO E#V | | |
|         SET L=LEN(FN) | | |
|         IF LEN(L)>n | | |
|           SET ROOT TO FN LEFT N CHARS | | |
|         ELSE | | |
|           SET ROOT TO FN | | |
|         ENDIF | | |
|       ENDIF | | |
|     ENDIF | | |
|   ENDIF | | |
| ENDIF | | |
| SET COUNTER TO 0 | 0 | 0 |
| LOOP THROUGH NAMES TABLE | | |
|   READ ENTRY IN NAMES TABLE | | |
|   IF NAME=ROOT | | |
|     COUNTER=COUNTER +1 | 0 | 1 |
|   ENDIF | | |
| END LOOP | | |
| INSERT ENTRY IN NAMES TABLE | TEST$OBJEC | TEST$OBJEC |
| COUNTER=COUNTER+1 | 1 | 2 |
| ROOT=ROOT$COUNTER | TEST$OBJEC1 | TEST$OBJEC2 |
| CREATE FILE(ROOT) | TEST$OBJEC1 | TEST$OBJEC2 |

As illustrated in the above example, compile manager 132 processes a first object name TEST/OBJECT. During the processing, compile manager truncates the object name to form the root TEST/OBJECT and determines that no previously processed object name utilize this root. As a result, compile manager 132 creates a new file named TEST$OBJEC1 for storage of any other objects associated with the compilation of the first object.

Compile manager 132 then processes a second object name TEST/OBJECTB. During the processing, compile manager truncates the object name to form the same root TEST/OB- "LSI$RES-NAME/SECURITYPGM4", and a third object with the name "LSI$RES-NAME/SECURITYPGM6." In this example, the example operation illustrated in FIGS. 4A and 4B may generate a first file having the name "LSI$RES-NA$1", a second file having the name "LSI$RES-NA$2", and a third file having the name "LSI$RES-NA$3." The names of these files are unique, but might not be sufficiently meaningful to user 100A. For instance, it may be difficult for user 100A to know that "LSI$RES-NA$3" is associated with "LSI$RES-NAME/SECURITYPGM6." For this reason, user 100A may configure compile manager 132 to use the modules of compile manager 132 illustrated in the example of FIG. 5. Given the object names in the previous example, when compile manager 132 uses the modules of compile manager 132 illustrated in the example of FIG. 5, compile manager 132 may generate a first file having the name "LSECURITYP$1", a second file having the name "LSSECURITY$1", and a third file having the name "LSISECURIT$1." These names may be more meaningful to user 100A because these names include one or more characters from the part of the original object name to the right of the "/" character in the original object name (i.e., the version portion) and one or more characters from the part of the original object name to the left of the "/" character (i.e., the filename portion).

In the example illustrated in FIG. 5, compile manager 132 comprises a name identification module 430 that, in response to the request for compilation of one of the objects, identifies an object name associated with the one of the objects. The object name includes a filename portion and a version portion. After name identification module 430 identifies the object name, name identification module 430 may provide the object name to a root name module 432.

When root name module 432 receives the object name, root name module 432 may determine a current root name that includes one or more characters of the filename portion and one or more characters of the version portion. Root name module 432 may select the current root name such that the current root name does not include more characters than allowed by a limitation on a length of file names within the file system as set by the operating system. Furthermore, root name module 432 may select the current root name by concatenating one or more characters of the filename portion and one or more characters of the version portion. After determining the current root name for the object name, root name module 432 may provide the current root name to a search module 434.

When search module 434 receives the current root name, search module 434 searches a set of previously generates names in names table 222 to determine a number of previously generated names that are "equivalent" to the current root name. As used in this disclosure, a name is "equivalent" to the current root name when the name was generated by modifying a root name that was equal to the current name. For example, a name "LSSECURITY$1" may have been generated by modifying the root name "LSECURITYP$1", which was derived from the object name "LSI$RES-NAME/SECURITYPGM4". Furthermore, "LSECURITYP$1" may be the current root name that was derived from the object name "LSI$RES-NAME/SECURITYPGM6". In this example, "LSSECURITY$1" is equivalent to the current root name because "LSSECURITY$1" was generated by modifying the root name "LSECURITYP$1", which is equal to the current root name. After determining the number of previously generated names that are "equivalent" to the current root name, search module 434 may provide this number to a root name modification module 438.

Root name modification module 438 may automatically modify the current root name based on the number of previously generated names that are equivalent to the current root name. As described in detail below, root name modification module 438 may modify the current root name to include an additional character from the filename portion and one fewer characters from the version portion when one of the previously generated names is equal to the current root name.

After root name modification module 438 modifies the current root name, a filename generation module 440 may generate a unique filename that includes the current root name. A repository creation module 442 may then creates a repository within the file system in accordance with the unique filename.

Figure 6:
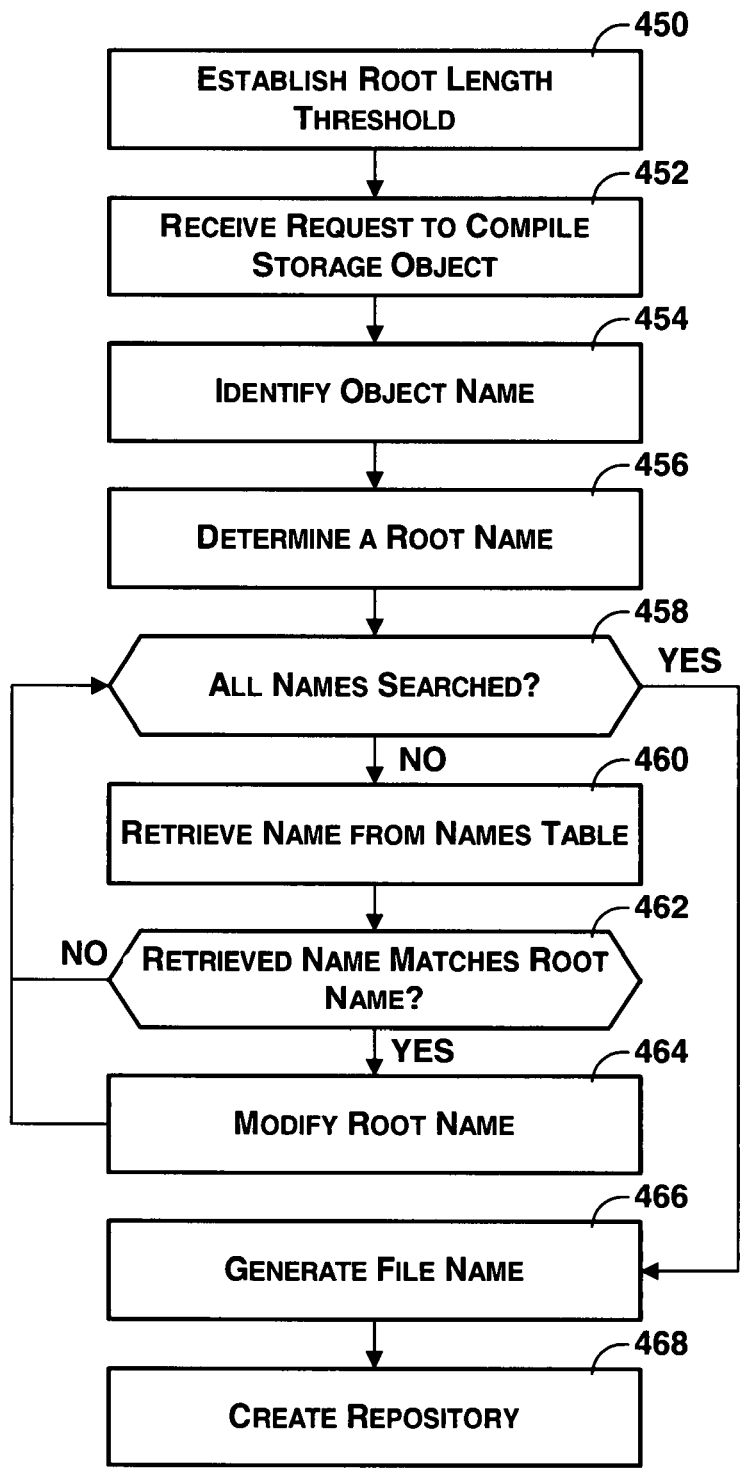
FIG. 6 is a flowchart illustrating an alternative exemplary operation of the computing system to generate unique filenames.

FIG. 6 is a flowchart illustrating an exemplary alternative operation of a computing system to generate unique file names. In order to generate these file names, compile manager 132 may initially establish a threshold N to define a maximum number of characters in a root name (450). As before, a root name represents a portion of the name of the created file 140A that originates from the object name of the object 142A currently being processed. After establishing the threshold N, compile manager 132 may receive a request to compile a storage object located within the file system provided by operating system 120 (452). When compile manager 132 receives the request, name identification module 430 may identify an object name associated with the storage object (454). The object name may include a filename portion and a version portion separated by a delimiting character such as a "/" character.

After name identification module 430 identifies the object name, root name module 432 may determine a root name that includes one or more characters of the filename portion and one or more characters of the version portion (456). For example, when N=10, root name module 432 may initially determine a root name that includes a first character of the filename portion, nine characters of version portion, a "$" character, and a number.

Search module 434 may then determine whether all names in names table 222 have been checked (458). If not all names in names table 222 have been checked ("NO" of 458), search module 434 may retrieve an unchecked name from names table 222 (460). After retrieving the name from names table 222, search module 434 may determine whether the name matches the determined root name (462). If the name does not match the root name ("NO" of 462), search module 434 may loop back and again determine whether all names in names table 222 have been checked (458).

If the name matches the root name ("YES" of 462), search module 434 may interact with root name modification module 438 to modify the root name (464). For example, if the name matches the root name, root name modification module 438 may determine whether the number of characters in the root name from the filename portion exceed a character threshold (e.g., 4 characters). In this example, if root name modification module 438 determines that the number of characters in the root name from the filename portion does not exceed the character threshold, root name modification module 438 may modify the root name to include an additional character from the filename portion and one fewer characters from the version portion. Furthermore, in this example, if root name modification module 438 determines that the number of characters in the root name from the filename portion exceeds the character threshold, root name modification module 438 may increment a counter that may be used after the "$" symbol in the filename. Because root name modification module 438 modifies the root name to include an additional character of the filename portion or increments the counter each time search module 434 determines that the root name matches a name, root name modification module 438, in effect, modifies the root name based on a number of the previously generated names that are equivalent to the root name. After modifying the root name, search module 434 may loop back and again determine whether all names in names table 222 have been searched (458).

If search module 434 determines that all names have been searched ("YES" of 458), file name generation module 440 may generate a unique file name that includes the root name (466). After generating the unique file name, repository creation module 442 may create a repository within the file system that is associated with the unique file name (468).

Figure 7A:
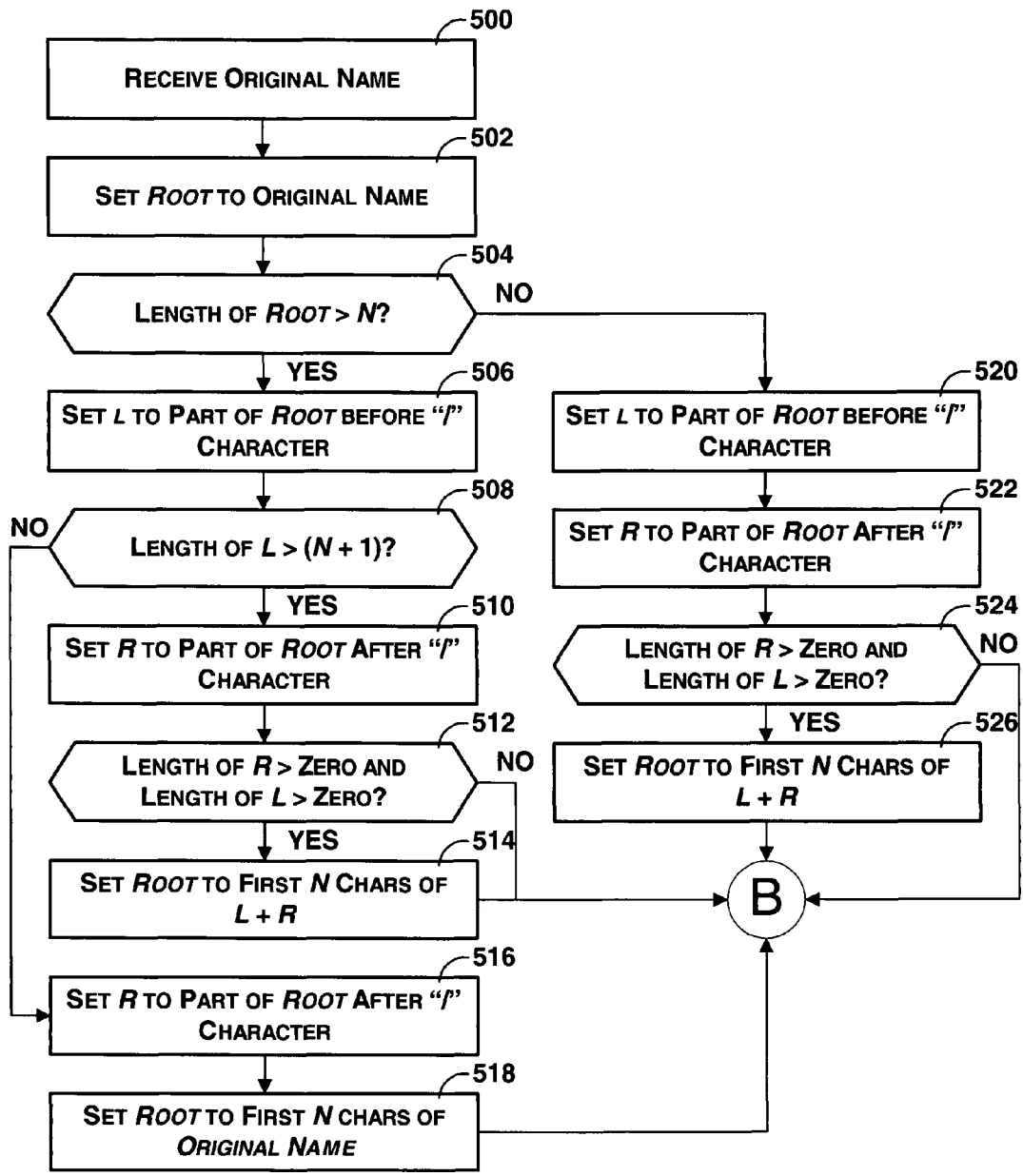
FIGS. 7A and 7B are a flowchart further illustrating an exemplary alternative operation of the computing system in further detail.
Figure 7B:
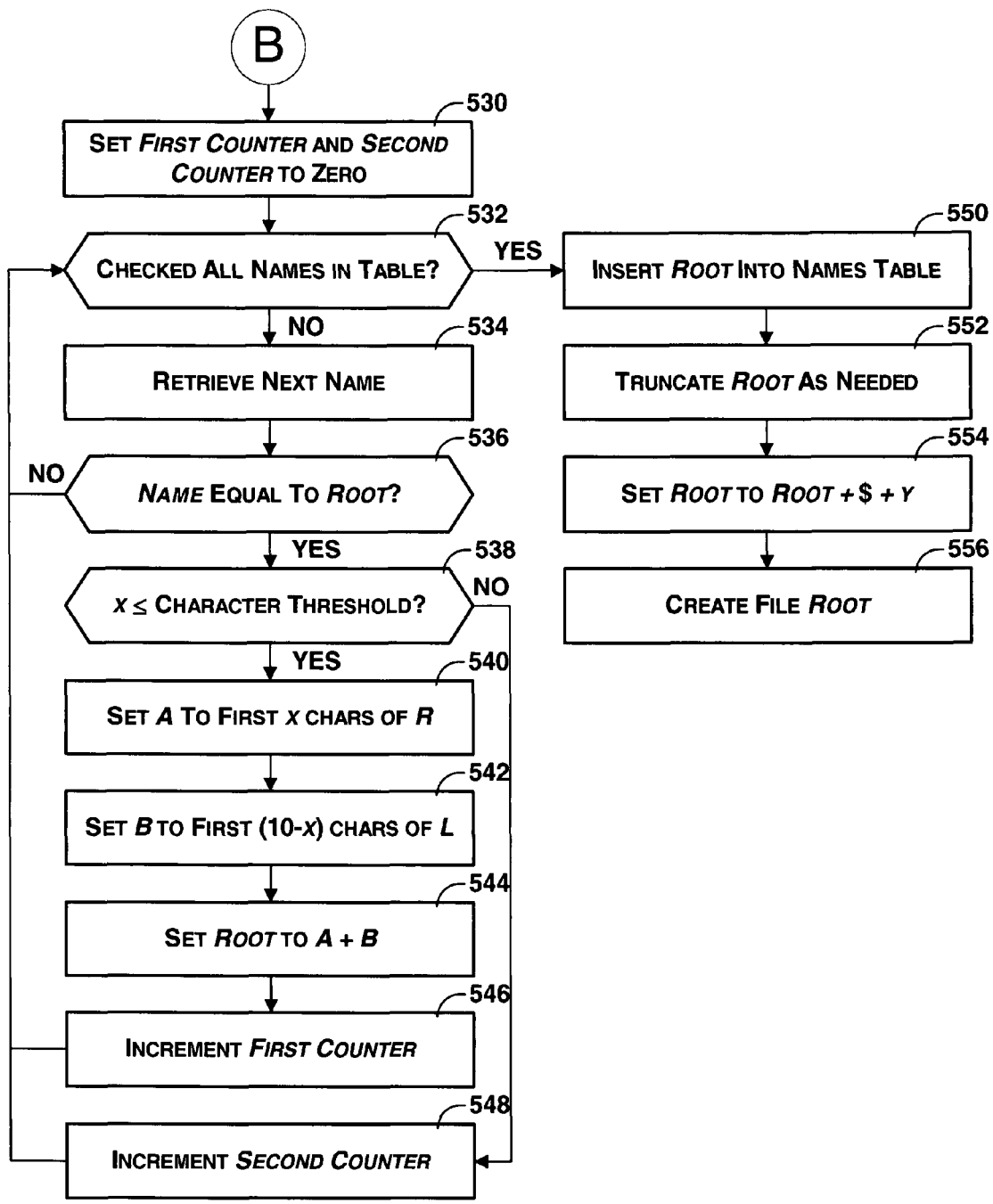

FIGS. 7A-7B are a flowchart illustrating the exemplary alternative operation in further detail. In this example, the flowchart of FIGS. 7A-7B is described with respect to operation of compile manager 132 (FIG. 1) when processing an object 142 (FIG. 2) to dynamically generate a file 140 during a compilation process in a manner that ensures the generated file has a unique file name for storing one or more other objects that may be additionally generated during compilation. As used in FIG. 7, the "+" symbol indicates concatenation and words in italics represent values or variable names.

Initially, compile manager 132 is invoked during a compilation phase of an application group. During this process, compile manager 132 processes one or objects 142 and receives an original name that one of users 100 has associated with one of the objects (500). When compile manager 132 receives the original name, compile manager 132 may set a variable "root" to the original name (502). Next, compile manager 132 may determine whether the length of "root" is greater than N (504).

If compile manager 132 determines that the length of "root" is greater than N ("YES" of 504), compile manager 132 may set a variable "L" to that part of "root" that is to the left of a "/" symbol (506). In other words, compile manager 132 may set "L" to the filename portion of the original object name. Compile manager 132 may then determine whether the length of "L" is greater than (N+1) (508). If the length of "L" is greater than (N+1) ("YES" of 508), compile manager 132 may set a variable "R" to that part of "root" that is to the left of the "/" symbol (510). That is, compile manager 132 may set "R" to the version portion of the original object name. Next, compile manager 132 may determine whether the length of "R" is greater than zero and whether the length of "L" is greater than zero (512). If the length of "R" is greater than zero and the length of "L" is greater than zero ("YES" of 512), compile manager 132 may set "root" to the first N characters of "L" concatenated with "R" (514). After setting "root" to the first N characters of "L" concatenated with "R", compile manager 132 may perform the operation illustrated in FIG. 7B. If the length of "R" is not greater than zero or the length of "L" is not greater than zero ("NO" of 512), compile manager 132 may also perform the operation illustrated in FIG. 7B.

If the length of "L" is not greater than (N+1) ("NO" of 508), compile manager 132 may set "R" to the part of "root" after the "/" character (516). Next, compile manager 132 may set "root" to the first N characters of the original name (518). After setting "root" to the first N characters of the original name, compile manager 132 may perform the operation illustrated in FIG. 7B.

If the length of "root" is not greater than N ("NO" of 504), compile manager 132 may set "L" to the part of "root" before the "/" character (520). Next, compile manager 132 may set "R" to the part of "root" after the "/" character (522). Compile manager 132 may then determine whether the length of "L" is greater than zero and whether the length of "R" if greater than zero (524). If the length of "L" is greater than zero and the length of "R" is greater than zero ("YES" of 524), compile manager 132 may set "root" to the first N characters of "L" concatenated with "R" (526). Compile manager 132 may then perform the operation illustrated in FIG. 7B. Furthermore, if the length of "L" is not greater than zero or the length of "R" is not greater than zero ("NO" of 524), compile manager 132 may perform the operation illustrated in FIG. 7B.

As illustrated in the example operation of FIG. 7B, compile manager 132 may set a variable "first counter" to zero and a variable "second counter" to zero (530). Next, compile manager 132 may determine whether all of the names in names table 222 have been checked (532).

If not all of the names in names table 222 have been checked ("NO" of 532), compile manager 132 may retrieve an unchecked name from names table 222 (534). After retrieving the name from names table 222, compile manager 132 may determine whether the value of "first counter" is less than or equal to a character threshold (538). For example, compile manager 132 may determine whether the value of "first counter" is less than or equal to four. If compile manager 132 determines that "first counter" is less than or equal to the character threshold ("YES" of 538), compile manager 132 may set a variable "A" to the first x characters of "R", where x is a number indicated by "first counter" (540). Next, compile manager 132 may set a variable "B" to the first y characters of "L", where y is a number equal to (N−x) (542). Compile manager 132 may set "root" to a string that results from concatenating "A" and "B" (544). After setting "root", compile manager 132 may increment the "first counter" (546). Once compile manager 132 has incremented the "first counter", compile manager 132 may loop back and again determine whether all of the names in names table 222 have been checked (532). If compile manager 132 determines that "first counter" is not less than or equal to the character threshold ("NO" of 538), compile manager 132 may increment the "second counter" (548) and then loop back and determine whether all of the names in names table 222 have been checked (532).

When all of the names in names table 222 have been checked ("YES" of 532), compile manager 132 may insert "root" into names table 222 (550). Next, compile manager 132 may truncate "root" to the first z characters of "root", where z is the number of digits of "second counter" plus one (552). After truncating "root", compile manager 132 may set "root" to a string that results from concatenating "root", the character "$" and the value indicated by "second counter" (554). The variable "root" now indicates the final name of the file. Compile manager 132 may then create a file having the name indicated by "root" (556).

The first column of Table 2 below includes example pseudocode to further illustrate the unique naming techniques described in the alternative operation illustrated in FIGS. 7A and 7B. Column 2 indicates a current value for a first unique object name generated by compile manager 132 at each executed step of the pseudocode, assuming N is set to a value of 10. Column 3 indicates a current value for a second object name generated by compile manager 132 after processing the first object name.

TABLE 2

| Pseudocode | Object Name A | Object Name B |
|---|---|---|
| SET ROOT TO OBJECT NAME | LSI$RES-NAME/SECURITYPGM1 | LSI$RES-NAME/SECURITYPGM2 |
| IF LEN(ROOT)>N | true (12) | true (12) |
| SET L TO FILE TEXT BEFORE "/" | LSI$RES-NAME | LS1$RES-NAME |

TABLE 2-continued

| Pseudocode | Object Name A | Object Name B |
|---|---|---|
| IF LEN(L)<N+1 | false (12) | false (12) |
|   SET R TO OBJECT TEXT AFTER "/" | | |
|   IF LEN(L)>0 | | |
|     IF LEN(V)>0 | | |
|       SET FN TO E$V | | |
|       IF LEN(FN) > N | | |
|         SET ROOT TO LEFT N CHARS OF FN | | |
|       ELSE | | |
|         SET ROOT TO FN | | |
|       ENDIF | | |
|     ENDIF | | |
|   ENDIF | | |
| ELSE | | |
|   SET R TO TEXT AFTER '/' | SECURITYPGM1 | SECURITYPGM2 |
|   SET ROOT TO OBJECT NAME LEFT N CHARS | LSI$RES-NAME | LSI$RES-NAME |
| ENDIF | | |
| ELSE | | |
|   SET L TO FILE TEXT BEFORE "/" | | |
|   IF LEN(L)<N+1 | | |
|     SET R TO OBJECT TEXT AFTER "/" | | |
|     IF LEN(L)>0 | | |
|       IF LEN(R)>0 | | |
|         SET FN TO L$R | | |
|         IF LEN(FN)>N | | |
|           SET ROOT TO LEFT N CHARS OF FN | | |
|         ELSE | | |
|           SET ROOT TO FN | | |
|         ENDIF | | |
|       ENDIF | | |
|     ENDIF | | |
|   ENDIF | | |
| ENDIF | | |
| SET COUNTER TO 0 | 0 | 0 |
| SET LEN OF R | 12 | 12 |
| IF LEN>N | | |
|   SET R TO LEFT N CHARS OF R | | |
| ELSE | | |
|   SET R TO R | SECURITYP | SECURITYP |
| ENDIF | | |
| IF LEN>0 | | |
|   SET ROOT TO FIRST CHARACTER OF ROOT + R | LSECURITYP | LSECURITYP |
| ENDIF | | |
| SET COUNTER2 TO 0 | 0 | 0 |
| LOOP THROUGH NAMES TABLE | | |
|   READ ENTY IN NAMES TABLE | | LSECURITYP |
|   IF NAME=ROOT | | |
|     IF LEN>0 | | |
|       IF COUNTER2=0 | | |
|         SET ROOT TO EEE LEFT MOST N CHARS + R | | LSSECURITY |
|       ELSE | | |
|         SET ROOT TO EEE LEFT MOST N+ CHARS + R | | |
|       ENDIF | | |
|       SET COUNTER2=COUNTER2+1 | | |
|       IF LEN(ROOT)>N | | |
|         SET ROOT TO ROOT LEFT MOST N CHARS | | |
|       ENDIF | | |
|     ELSE | | |
|       COUNTER=COUNTER+1 | 0 | 0 |
|     ENDIF | | |
|   ENDIF | | |
| END LOOP | | |
| INSERT ENTRY IN NAMES TABLE | LSECURITYP | LSSECURITY |
| IF LEN>0 | | |
|   SET COUNTER.COUNTER+1 | 1 | 1 |
|   IF COUNTER<N DIGETS | | |
|     SET ROOT TO ROOT$COUNTER | LSECURITYP$1 | LSSECURITY$1 |
|   ENDIF | | |
| ENDIF | | |
| CREATE FILE(ROOT) | LSECURITYP$1 | LSSECURITY$1 |

As illustrated in the above example, compile manager 132 processes a first object name LSI$RES-NAME/SECURITYPGM1. By performing the above instructions, compile manager 132 may generate the filename LSECURITYP$1 based on the first object name. Furthermore, compile manager 132 may generate the filename LSSECURITY$1 based on the second object name LSI$RES-NAME/SECURITYPGM2.

In one or more exemplary embodiments, the functions described may be implemented in hardware, software, and/or firmware, or any combination thereof. If implemented in hardware, the functions may be implemented in one or more microprocessors, microcontrollers, digital signal processors (DSPs), application specific integrated circuits (ASICs), field programmable gate arrays (FPGAs), or the like. Such components may reside within a communication system, data writing and/or reading system, or other systems. If implemented in software, the functions may be stored as one or more instructions or code on a computer-readable medium. Computer-readable media includes both computer storage media and communication media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where "disks" usually reproduce data magnetically, while "discs" reproduce data optically with lasers. Combinations of the above should also be included within the scope of computer-readable media.

Various embodiments of the invention have been described. These and other embodiments are within the scope of the following claims.

The invention claimed is:

1. A computer-implemented method comprising:
    receiving with a computer a request to compile a storage object located within a file system provided by an operating system of the computer;
    in response to the compilation request, identifying an object name associated with the storage object, wherein the object name includes a filename portion and a version portion;
    determining a current root name that includes one or more characters of the filename portion and one or more characters of the version portion;
    determining whether a number of characters in the current root name from the filename portion is in excess of a character threshold;
    searching a set of previously generated names to determine a number of previously generated names that are equivalent to the current root name,
    wherein a name is equivalent to the current root name when the name was generated by modifying a root name that was equal to the current root name;
    automatically modifying the current root name based on the number of previously generated names that are equivalent to the current root name;
    automatically modifying the current root name to include an additional character from the filename portion and one fewer characters from the version portion when one of the previously generated names is equal to the current root name and when the number of characters in the current root name from the filename portion is not in excess of the character threshold;
    generating a unique file name that includes the current root name; and
    creating a repository within the file system in accordance with the unique file name.

2. The method of claim 1, further comprising:
    compiling the storage object to produce one or more additional storage objects; and
    storing the additional storage objects within the repository.

3. The method of claim 2, wherein storing the additional storage objects comprises storing compilation logs.

4. The method of claim 2, wherein the repository comprises a file that provides a logical association for grouping the additional storage objects within the file system, and
    wherein each of the additional storage objects has an associated object name that is accessible to a user via the file system.

5. The method of claim 1, wherein determining the current root name comprises selecting the current root name such that the current root name does not include more characters than allowed by a limitation on a length of file names within the file system as set by the operating system.

6. The method of claim 5, further comprising programmatically adjusting the threshold to allow generation of a varying number of unique file names.

7. The method of claim 1,
    wherein searching the set of previously generated names comprises determining a number of previously generated file names that match the current root name in excess of the character threshold, and
    wherein generated a unique file name comprises combining the current root name with a numerical string calculated from the number of matching previously generated file names.

8. The method of claim 1, wherein searching the set of previously generated names comprises searching a set of root names previously generated during a compilation process.

9. The method of claim 1, further comprising storing the root name in a names table, wherein the names table contains a set of root names previously generated during a compilation process.

10. A computing system comprising:
    a processor that executes an operating system, wherein the operating system provides a file system for storage of objects;
    wherein the processor executes a compile manager responsive to a compilation request; and
    wherein the processor executes a names table that stores file names previously generated by the compile manager,
    wherein the compile manager comprises:
    a name identification module that, in response to the request for compilation of one of the objects, identifies an object name associated with the one of the objects, wherein the object name includes a filename portion and a version portion;
    a root name module that determines a current root name that includes one or more characters of the filename portion and one or more characters of the version portion and whether a number of characters in the current root name from the filename portion is in excess of a character threshold;
    a search module that searches a set of previously generated names to determine a number of previously generated names that are equivalent to the current root name, wherein a name is equivalent to the current root name when the name was generated by modifying a root name that was equal to the current root name;
a root name modification module that automatically modifies the current root name based on the number of previously generated names that are equivalent to the current root name, and wherein the root name modification module modifies the current root name to include an additional character from the filename portion and one fewer characters from the version portion when one of the previously generated file names is equal to the current root name and when the number of characters in the current root name from the filename portion is not in excess of the character threshold;
a filename generation module that generates a unique filename that includes the current root name; and
a repository creation module that creates the repository within the file system in accordance with the unique filename.

11. The computing system of claim 10, wherein the compile manager compiles the object to produce one or more additional objects, and stores the additional objects within the repository.

12. The computing system of claim 11, wherein the repository comprises a file that provides a logical association for grouping the additional storage objects within the file system, and
wherein each of the additional storage objects has an associated object name that is accessible to a user via the file system.

13. The computing system of claim 10, wherein the computing system comprises a mainframe computer system running an OS2200 operating system.

* * * * *